(12) United States Patent
Hu et al.

(10) Patent No.: US 12,065,144 B2
(45) Date of Patent: Aug. 20, 2024

(54) INFORMATION PROCESSING DEVICE AND INFORMATION PROCESSING METHOD

(71) Applicant: Panasonic Intellectual Property Management Co., Ltd., Osaka (JP)

(72) Inventors: Beier Hu, Osaka (JP); Motoshi Anabuki, Hyogo (JP); Kazuma Takeuchi, Kyoto (JP); Stephen William John, Nara (JP); Shinji Ohyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

(21) Appl. No.: 17/708,650

(22) Filed: Mar. 30, 2022

(65) Prior Publication Data
US 2022/0219693 A1 Jul. 14, 2022

Related U.S. Application Data

(63) Continuation of application No. PCT/JP2021/019958, filed on May 26, 2021.
(Continued)

(30) Foreign Application Priority Data
Sep. 3, 2020 (JP) .................................. 2020-148106

(51) Int. Cl.
*B60W 30/14* (2006.01)
(52) U.S. Cl.
CPC ....... *B60W 30/143* (2013.01); *B60W 2520/10* (2013.01); *B60W 2556/45* (2020.02); *B60W 2720/10* (2013.01)

(58) Field of Classification Search
CPC .......... B60W 30/143; B60W 2520/10; B60W 2556/45; B60W 2720/10; B60W 2540/10;
(Continued)

(56) References Cited

U.S. PATENT DOCUMENTS 6,134,499 A * 10/2000 Goode ............... B60K 31/0058
123/333
2002/0022909 A1 2/2002 Karem

FOREIGN PATENT DOCUMENTS

EP   3 561 631    10/2019
JP   2010-152833   7/2010

OTHER PUBLICATIONS

International Search Report (ISR) issued on Aug. 17, 2021 in International (PCT) Application No. PCT/JP2021/019958.
(Continued)

*Primary Examiner* — Michael V Kerrigan
(74) *Attorney, Agent, or Firm* — Wenderoth, Lind & Ponack, L.L.P.

(57) ABSTRACT

An information processing device (or a vehicle control device) includes: a vehicle information obtainer that obtains a first moving speed of a vehicle; a communicator that obtains an operation amount of an operation related to a speed by an instrument for a remote operation of the vehicle; a vehicle speed instruction generator that generates a second moving speed based on the operation amount; and an outputter that outputs the operation amount as a moving speed control amount, when the first moving speed is lower than a first threshold, and a control amount converted from the second moving speed as the moving speed control amount, when the first moving speed is higher than or equal to a second threshold.

15 Claims, 14 Drawing Sheets

Related U.S. Application Data

(60) Provisional application No. 63/060,830, filed on Aug. 4, 2020.

(58) Field of Classification Search
CPC ........ B60W 2710/1038; B60W 30/182; G05D 1/0011; G05D 1/0223; G05D 1/00; G05D 1/0022; G05D 1/0066; G05D 1/02; G08G 1/09

See application file for complete search history.

(56) References Cited

OTHER PUBLICATIONS

Extended European Search Report issued Dec. 15, 2023 in corresponding European Patent Application No. 21853131.7.

\* cited by examiner

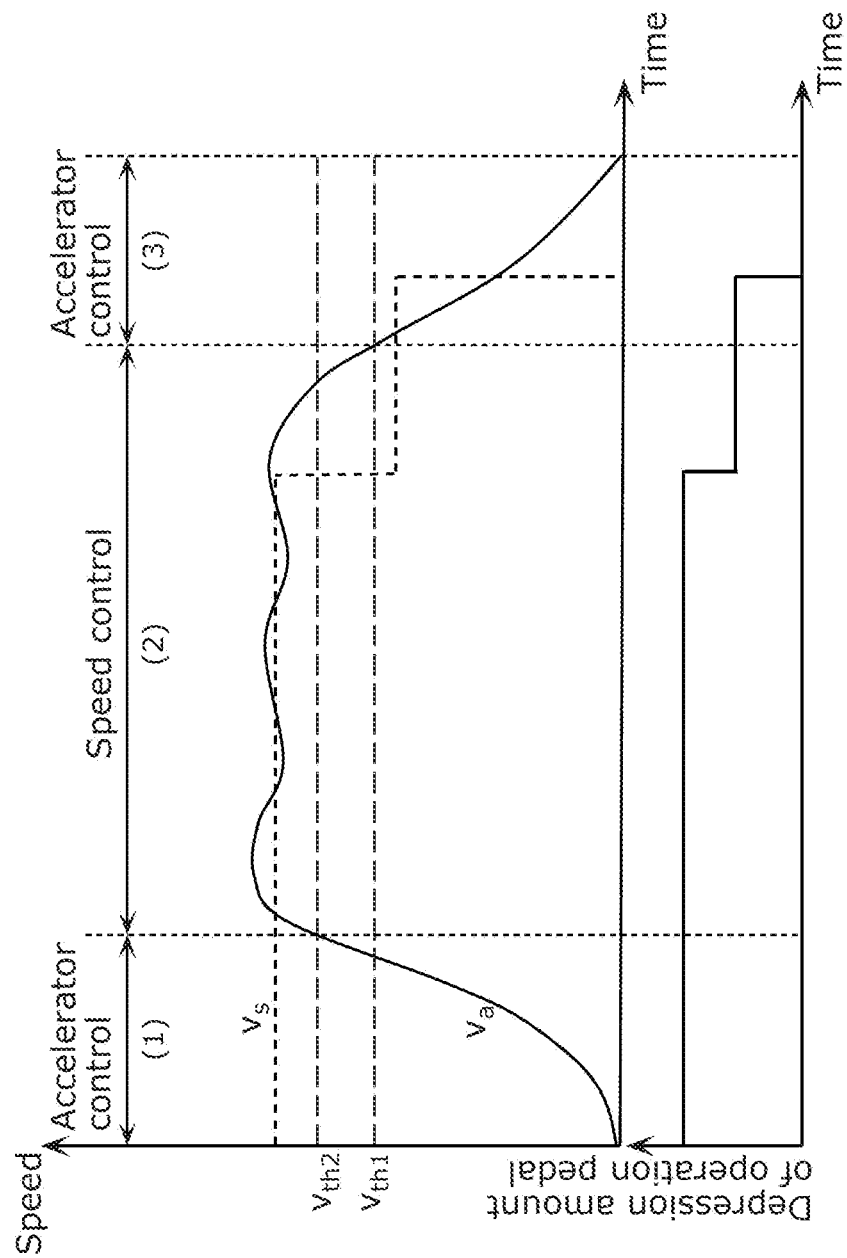

FIG. 13A

| History No. | Operator No. | Vehicle type | Corresponding remote-operation event No. | Travel log data |
|---|---|---|---|---|
| No.1001 | No.1061 | A | ·No. 2 Move to destination | Operation data on accelerator, brake, and steering wheel in each certain period and vehicle speed information |
| No.1002 | No.1067 | C | ·No. 2 Move to destination | |
| No.1003 | No.1023 | D | ·No. 3 Pull over | |
| No.1004 | No.1012 | C | ·No. 2 Move to destination | |
| No.1005 | No.1041 | D | ·No. 5 Avoid obstacle on travel route | |
| ... | ... | ... | ... | ... |

FIG. 14A

| History No. | Operator No. | Vehicle type | Corresponding remote-operation event No. | Shift operation data |
|---|---|---|---|---|
| No.1001 | No.1061 | A | ·No. 2 | Speed and steering information at time of shift operation |
| No.1002 | No.1067 | C | ·No. 2 | ... |
| No.1003 | No.1023 | D | ·No. 3 | ... |
| No.1004 | No.1012 | C | ·No. 2 | ... |
| No.1005 | No.1041 | D | ·No. 5 | ... |
| ... | ... | ... | ... | ... |

INFORMATION PROCESSING DEVICE AND INFORMATION PROCESSING METHOD

CROSS REFERENCE TO RELATED APPLICATIONS

This is a continuation application of PCT International Application No. PCT/JP2021/019958 filed on May 26, 2021, designating the United States of America, which is based on and claims priority of U.S. Provisional Patent Application No. 63/060,830 filed on Aug. 4, 2020 and Japanese Patent Application No. 2020-148106 filed on Sep. 3, 2020. The entire disclosures of the above-identified applications, including the specifications, drawings and claims are incorporated herein by reference in their entirety.

FIELD

The present disclosure relates to an information processing device and an information processing method associated with remote control of a moving body.

BACKGROUND

In recent years, the spread of autonomous driving vehicles has been expected. Accordingly, there is an increasing demand for a remote operation of a vehicle for emergency response. For example, Patent Literature (PTL) 1 discloses an unmanned moving body system for a remote operation of an unmanned moving body. This unmanned moving body system allows the unmanned moving body to move autonomously at a high moving speed of the unmanned moving body, and performs the remote operation of the unmanned moving body at a low moving speed of the unmanned moving body.

CITATION LIST

Patent Literature

PTL 1: Japanese Unexamined Patent Application Publication No. 2010-152833

SUMMARY

Technical Problem

However, at a decreasing moving speed of the moving body, a remote operation may be difficult. Background art as disclosed in PTL 1 fails to consider such a case.

To address the problem, the present disclosure provides an information processing device, for example, less degrading the operability of the moving body by an instrument for a remote operation of the moving body even at a decreasing moving speed of the moving body.

Solution to Problem

An information processing device according to the present disclosure includes: a first obtainer that obtains a first moving speed of a moving body; a second obtainer that obtains an operation amount of an operation related to a moving speed by an instrument for a remote operation of the moving body; a generator that generates a second moving speed based on the operation amount; and an outputter that outputs the operation amount as a moving speed control amount that is an amount of controlling the moving speed of the moving body, when the first moving speed is lower than a first threshold, and a control amount converted from the second moving speed as the moving speed control amount, when the first moving speed is higher than or equal to a second threshold.

This general and specific aspect may be implemented using a system, a method, an integrated circuit, a computer program, or a computer-readable recording medium such as a CD-ROM, or any combination of systems, methods, integrated circuits, computer programs, or recording media.

Advantageous Effects

The information processing device, for example, according to an aspect of the present disclosure less degrades the operability of a moving body by an instrument for a remote operation of the moving body even at a decreasing moving speed of the moving body.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 83 illustrates conditions for a shift from the accelerator control mode to the speed control mode.

FIG. 9 illustrates a specific example shift of the control mode.

FIG. 133 illustrates an example method of determining the shift conditions.

FIG. 143 illustrates another example method of determining the shift conditions.

DESCRIPTION OF EMBODIMENT

Figure 1:
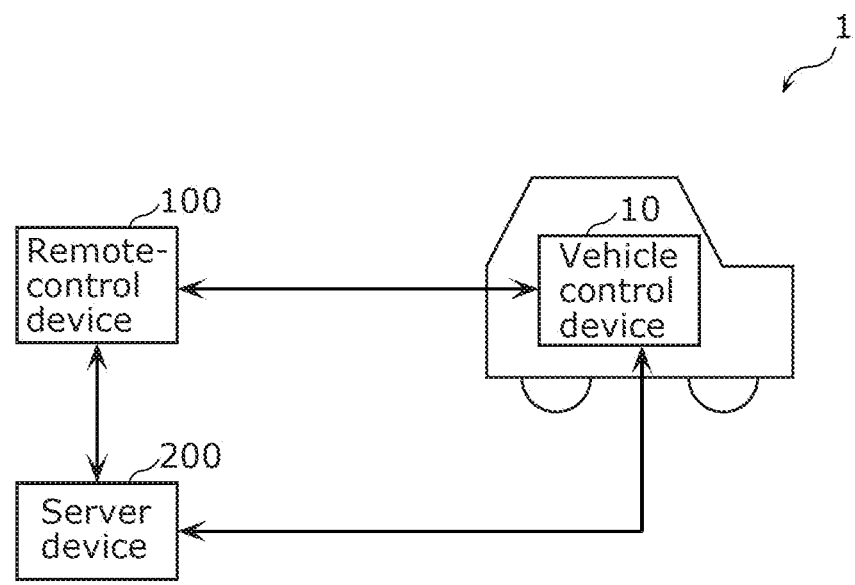
FIG. 1 shows an example of a remote-operation system according to an embodiment.

As described above, at a decreasing moving speed of the moving body, a remote operation may be difficult.

For example, the remote operation of the moving body is performed by wireless communications. In view of a communication delay, for example, the operation amount of the operation by an instrument for the remote operation of the moving body (e.g., an operation user interface (UI) such as a pedal for the remote operation of a vehicle) is once converted into the speed of the moving body to be output to the moving body. On the other hand, this method requires feedback control to keep the moving body at a constant speed. Thus, the responsiveness of the operation UI to the operation deteriorates. Accordingly, the operability of the operation UI deteriorates, when the operation UI operates the moving body moving at a lower speed that allows a fine operation.

To address the problems, the information processing device according to an aspect of the present disclosure includes: a first obtainer that obtains a first moving speed of a moving body; a second obtainer that obtains an operation amount of an operation related to a moving speed by an instrument for a remote operation of the moving body; a generator that generates a second moving speed based on the operation amount; and an outputter that outputs the operation amount as a moving speed control amount that is an amount of controlling the moving speed of the moving body, when the first moving speed is lower than a first threshold, and a control amount converted from the second moving speed as the moving speed control amount, when the first moving speed is higher than or equal to a second threshold.

With this configuration, when the first moving speed of the moving body is higher than or equal to the second threshold (e.g., when the moving body moves at a middle or higher speed), a fine operation is difficult to perform and even a poor responsiveness of the instrument for the remote operation of the moving body to the operation is less problematic. Accordingly, when the first moving speed of the moving body is higher than or equal to the second threshold, the moving speed control amount according to the second moving speed is output in view of a communication delay or other problems. The second moving speed is generated based on the operation amount of the operation related to the moving speed by the instrument. On the other hand, when the first moving speed of the moving body is lower than the first threshold (e.g., when the moving body moves at a lower speed), a fine operation is easy to perform and a poor responsiveness of the instrument to the operation is more problematic. Accordingly, when the first moving speed of the moving body is lower than the first threshold, the operation amount of the operation related to the moving speed by the instrument is unchanged output as the moving speed control amount. In this manner, a most suitable moving speed control amount is output in accordance with the first moving speed of the moving body. Even at a decreasing moving speed of the moving body, the operability of the moving body by the instrument for the remote operation of the moving body is less degraded.

The information processing device may further include: a shift controller that shifts a moving speed control mode of the moving body to a first mode for outputting the operation amount as the moving speed control amount, when the first moving speed is lower than the first threshold and the second moving speed is lower than the first moving speed, and the moving speed control mode of the moving body to a second mode for outputting the control amount converted from the second moving speed as the moving speed control amount, when the first moving speed is higher than or equal to the second threshold and the second moving speed is higher than the first moving speed. The outputter may output the moving speed control amount in accordance with the first mode or the second mode.

For example, if the first moving speed lower than the first threshold is the only condition for a shift to the first mode, the control mode may shift frequently. Similarly, if the first moving speed higher than or equal to the second threshold is the only condition for a shift to the second mode, the control mode may shift frequently. To address the problems, this aspect also sets the condition related to the second moving speed generated based on the operation amount of the operation related to the moving speed by the instrument. This reduces the shifts of the control mode.

The information processing device may further include: a setter that sets an upper limit of the moving speed control amount based on the first moving speed, when the moving speed control mode of the moving body is shifted and a difference between the first moving speed and the second moving speed is larger than a third threshold. The outputter may output the moving speed control amount further in accordance with the upper limit of the moving speed control amount.

Assume that the difference between the first moving speed of the moving body and the second moving speed generated based on the operation amount by the instrument for the remote operation of the moving body is larger than the third threshold at a shift of the control mode. If the moving speed control amount according to the control mode after the shift is unchanged output, the moving body may accelerate suddenly and run into danger. To address the problem, this aspect also sets the upper limit of the moving speed control amount based on the first moving speed, when the difference is larger than the third threshold. This reduces sudden acceleration of the moving body at a shift of the control mode, and allows gradual acceleration of the moving body.

The generator may generate the second moving speed in accordance with the operation amount to set an upper limit of the operation amount to be equal to an upper limit of the moving speed of the moving body.

At the time of the remote operation of the moving body, the moving body may have an upper limit of the moving speed. Accordingly, the second moving speed is generated in accordance with the operation amount to set the upper limit of the operation amount by the instrument for the remote operation of the moving body to be equal to the upper limit of the moving speed of the moving body. This keeps the second moving speed under the upper limit of the moving speed of the moving body at the time of the remote operation.

The second obtainer may further obtain the first threshold and the second threshold determined based on at least one of an operation amount history related to the moving speed or a moving speed history.

With this configuration, the first and second thresholds can be determined based on the operation amount history related to the moving speed by the instrument for the remote operation of the moving body, or the moving speed history of the moving body. The first and second thresholds determined in this manner are obtained to determine whether to output the operation amount by the instrument for the remote operation of the moving body unchanged as the moving speed control amount or the moving speed control amount according to the second moving speed.

The second obtainer may obtain the first threshold and the second threshold determined further based on an operation amount history related to a moving direction of the moving body.

For example, if there is a larger amount of operation related to the moving direction of the moving body, the moving body is assumed to be under a fine operation and move at a lower speed. Thus, the first threshold can be determined based on the operation amount history related to the moving speed or the moving speed history as of the larger operation amount related to the moving direction of the moving body. If there is a smaller amount of operation related to the moving direction of the moving body, the moving body is assumed to be under no fine operation and move at a middle or higher speed. Thus, the second threshold can be determined based on the operation amount history related to the moving speed or the moving speed history as of the smaller operation amount related to the moving direction of the moving body. The first and second thresholds determined in this manner are obtained to determine whether to output the operation amount by the instrument for the remote operation of the moving body unchanged as the moving speed control amount or the moving speed control amount according to the second moving speed.

The second obtainer may obtain the first threshold and the second threshold determined further based on a history of a shift operation as an instruction to shift the moving speed control mode of the moving body.

For example, if there is an instruction to shift the moving speed control mode of the moving body to the first mode, the moving body is assumed to be under a fine operation and move at a lower speed. Thus, the first threshold can be determined based on the operation amount history related to the moving speed or the moving speed history as of the instruction to shift to the first mode. If there is an instruction to shift the moving speed control mode of the moving body to the second mode, the moving body is assumed to be under no fine operation and move at a middle or higher speed. Thus, the second threshold can be determined based on the operation amount history related to the moving speed or the moving speed history as of the instruction to shift to the second mode. The first and second thresholds determined in this manner are obtained to determine whether to output the operation amount by the instrument for the remote operation of the moving body unchanged as the moving speed control amount or the moving speed control amount according to the second moving speed.

The second obtainer may obtain the first threshold and the second threshold determined further based on an operation history associated with an operator of the instrument.

This configuration allows each operator of the instrument for the remote operation of the moving body to determine the first and second thresholds. The first and second thresholds determined in this manner are obtained for each operator to determine whether to output the operation amount by the instrument for the remote operation of the moving body unchanged as the moving speed control amount or the moving speed control amount according to the second moving speed.

The second obtainer may obtain instruction information further based on a shift operation as an instruction to shift the moving speed control mode of the moving body. The shift controller may shift the moving speed control mode of the moving body in accordance with the instruction information.

This allows a manual shift of the moving speed control mode of the moving body.

An information processing method according to an aspect of the present disclosure is to be executed by a computer. The information processing method includes: obtaining an operation amount of an operation related to a moving speed by an instrument for a remote operation of the moving body; outputting the operation amount obtained; obtaining mode information indicating whether a moving speed control mode of the moving body is a first mode or a second mode, the first mode being for outputting the operation amount as a moving speed control amount that is an amount of controlling the moving speed of the moving body when a first moving speed of the moving body is lower than a first threshold, the second mode being for outputting a control amount converted from a second moving speed generated based on the operation amount as the moving speed control amount when the first moving speed is higher than or equal to a second threshold; and indicating the moving speed control mode of the moving body based on the mode information.

Accordingly, the information processing method is provided which less degrades the operability of the moving body by the instrument for the remote operation of the moving body even at a decreasing moving speed of the moving body. The method allows the operator of the instrument for the remote operation of the moving body to recognize the moving speed control mode of the moving body.

The information processing method may further include: obtaining an operation history including at least a history of the operation amount related to the moving speed or a moving speed history; determining the first threshold and the second threshold based on at least one of the operation history or the moving speed history; and outputting the first threshold and the second threshold determined.

Accordingly, the first and second thresholds can be determined based on the operation amount history related to the moving speed by the instrument for the remote operation of the moving body or the moving speed history of the moving body. The first and second thresholds determined in this manner are output to determine whether to output the operation amount by the instrument for the remote operation of the moving body unchanged as the moving speed control amount or the moving speed control amount according to the second moving speed.

The operation history may further include an operation amount history related to a moving direction of the moving body.

For example, if there is a larger amount of operation related to the moving direction of the moving body, the moving body is assumed to be under a fine operation and move at a lower speed. Thus, the first threshold can be determined based on the operation amount history related to the moving speed or the moving speed history as of the larger operation amount related to the moving direction of the moving body. If there is a smaller amount of operation related to the moving direction of the moving body, the moving body is assumed to be under no fine operation and move at a middle or higher speed. Thus, the second threshold can be determined based on the operation amount history related to the moving speed or the moving speed history as of the smaller operation amount related to the moving direction of the moving body.

The operation history may further include a history of a shift operation as an instruction to shift the moving speed control mode of the moving body.

For example, if there is an instruction to shift the moving speed control mode of the moving body to the first mode, the moving body is assumed to be under a fine operation and move at a lower speed. Thus, the first threshold can be determined based on the operation amount history related to the moving speed or the moving speed history as of the instruction to shift to the first mode. If there is an instruction to shift the moving speed control mode of the moving body to the second mode, the moving body is assumed to be under no fine operation and move at a middle or higher speed. Thus, the second threshold can be determined based on the operation amount history related to the moving speed or the moving speed history as of the instruction to shift to the second mode.

The information processing method may further include: identifying an operator of the instrument; obtaining a specific operation history associated with the operator identified; determining the first threshold and the second threshold based on the specific operation history; and outputting the first threshold and the second threshold determined.

This method allows each operator of the instrument for the remote operation of the moving body to determine the first and second thresholds. The first and second thresholds determined in this manner are output to allow each operator to determine whether to output the operation amount by the instrument for the remote operation of the moving body unchanged as the moving speed control amount or the moving speed control amount according to the second moving speed.

The information processing method may further include: obtaining a shift operation as an instruction to shift the moving speed control mode of the moving body; generating instruction information based on the shift operation; and outputting the instruction information.

This allows a manual shift of the moving speed control mode of the moving body.

Now, an embodiment will be described in detail with reference to the drawings.

Note that the embodiment described below is a mere comprehensive or specific example. The numerical values, shapes, materials, constituent elements, the arrangement and connection of the constituent elements, steps, step orders etc. shown in the following embodiment are thus mere examples, and are not intended to limit the scope of the present disclosure.

Embodiment

Now, an information processing device and an information processing method according to the embodiment will be described.

FIG. 1 shows an example of remote-operation system 1 according to the embodiment.

Remote-operation system 1 includes vehicle control device 10, remote-control device 100, and server device 200. Vehicle control device 10 is an example of the "information processing device". Vehicle control device 10 is mounted on a vehicle, for example. Note that the information processing device according to the present disclosure is applicable not only to a vehicle but also a moving body (e.g., an unmanned aerial vehicle). An example will be described below where the moving body is a vehicle and the information processing device is vehicle control device 10. Each of remote-control device 100 and server device 200 is an example of the "computer" that executes the information processing method. Remote-control device 100 and server device 200 may be located in different places or in a single place, or may be integrated. Alternatively, the constituent elements of remote-control device 100 and server device 200 may be distributed, That is, the constituent elements of remote-control device 100 are not necessarily located in a single case. The constituent elements of server device 200 are not necessarily located in a single case.

Vehicle control device 10 is for controlling the vehicle through a remote operation. Vehicle control device 10 controls the vehicle based on information for the remote operation of the vehicle obtained from remote-control device 100. Details of vehicle control device 10 will be described later.

Remote-control device 100 is for controlling the vehicle including vehicle control device 10 through a remote operation. Remote-control device 100 outputs, to vehicle control device 10, information for the remote operation of the vehicle to perform the remote operation of the vehicle. Details of remote-control device 100 will be described later.

Server device 200 is a data management server device that manages the data such as the history of the operation by remote-control device 100. Details of server device 200 will be described later.

Now, the constituent elements of remote-control device 100 will be described.

Figure 2:
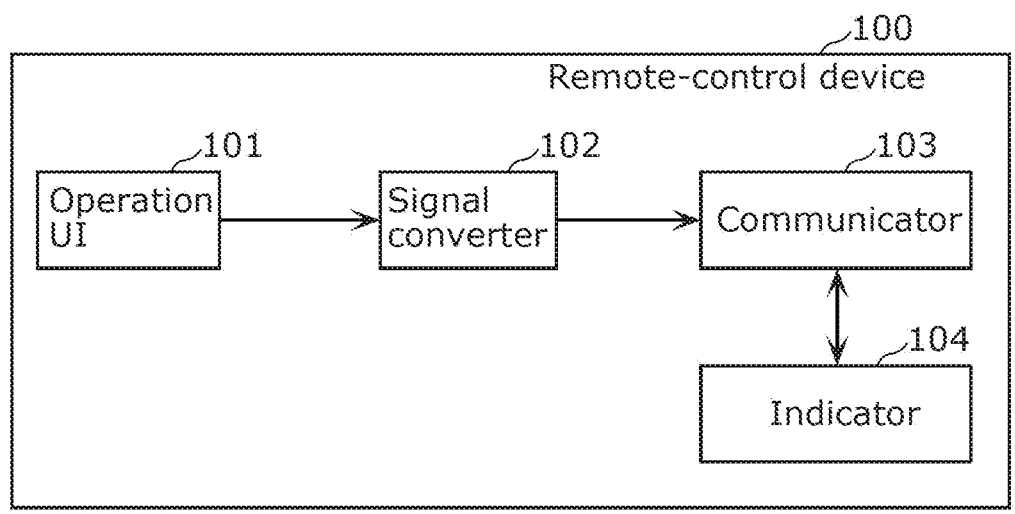
FIG. 2 is a block diagram showing an example of a remote-control device according to the embodiment.

FIG. 2 is a block diagram showing an example of remote-control device 100 according to the embodiment.

Remote-control device 100 includes operation UI 101, signal converter 102, communicator 103, and indicator 104.

For example, remote-control device 100 is a computer including a processor, a communication interface, a UI, and a memory, for example. The memory includes a read-only memory (ROM) and a random-access memory (RAM), for example, each storing the programs to be executed by the processor. Each of operation UI 101, signal converter 102, communicator 103, and indicator 104 is a processor that executes the programs stored in the memory, a communication interface, or a UI, for example.

Operation UI 101 is an example of the "instrument for remote control of a vehicle". For example, operation UT 101 includes a steering wheel and pedals like a typical vehicle, By operating the steering wheel, accelerator pedal, and brake pedal of operation UI 101, the vehicle including vehicle control device 10 can be controlled. The depression amount of the accelerator pedal of operation UI 101 is an example of the "operation amount of an operation related to the moving speed by the instrument for the remote operation of the moving body". Note that the moving speed may be the speed or the velocity, Hereinafter, the term "speed" may be replaced with the term "velocity". The operation amount of the steering wheel of operation UI 101 is an example of the "operation amount of an operation related to the moving direction by the instrument for the remote operation of the moving body". The accelerator pedal of operation UT 101 will be hereinafter referred to as an "operation pedal" and the steering wheel of operation UI 101 as an "operation steering wheel". Note that operation UI 101 may be a joystick or a gear shift, for example.

Signal converter 102 obtains an amount of operation by operation UI 101 and converts the obtained amount into a digital value, for example. For example, when the operation pedal is not depressed, signal converter 102 outputs a digital value indicating 0% as the depression amount of the operation pedal. When the operation pedal is fully depressed, signal converter 102 outputs a digital value indicating 100% as the operation amount of the operation pedal. Note that operation UI 101 may be not only an operation pedal or an operation steering wheel as described above but also a joystick or a gear lever. Signal converter 102 may have functions corresponding to various devices. Since each operation UI 101 may have an individual difference, signal converter 102 may have a calibration function.

Communicator 103 is a communication interface for communications with vehicle control device 10 and server device 200. Note that remote-control device 100 may include both a communication interface for vehicle control device 10 and a communication interface for server device 200. Communicator 103 outputs, to vehicle control device 10, the operation amount obtained by signal converter 102, specifically, a digital value converted based on the operation amount obtained by signal converter 102. Communicator 103 also outputs the operation history of the operation amount obtained by signal converter 102 to server device 200. Communicator 103 obtains, from vehicle control device 10, the mode information indicating whether the control mode of the vehicle speed is an accelerator control mode or a speed control mode. Details of the accelerator control mode and the speed control mode will be described later. Communicator 103 also obtains, from indicator 104, the instruction information according to the shift operation as an instruction to shift the control mode of the vehicle speed. Communicator 103 then outputs the instruction information to vehicle control device 10.

Indicator 104 is, for example, a display device such as a display, a lamp, or a speaker that indicates the control mode of the vehicle speed based on the mode information obtained by communicator 103. What are indicated by indicator 104 will be described later. Indicator 104 may function to receive an input, for example, may be a touch panel display or may have mechanical buttons.

Now, an operation of remote-control device 100 will be described.

Figure 3:
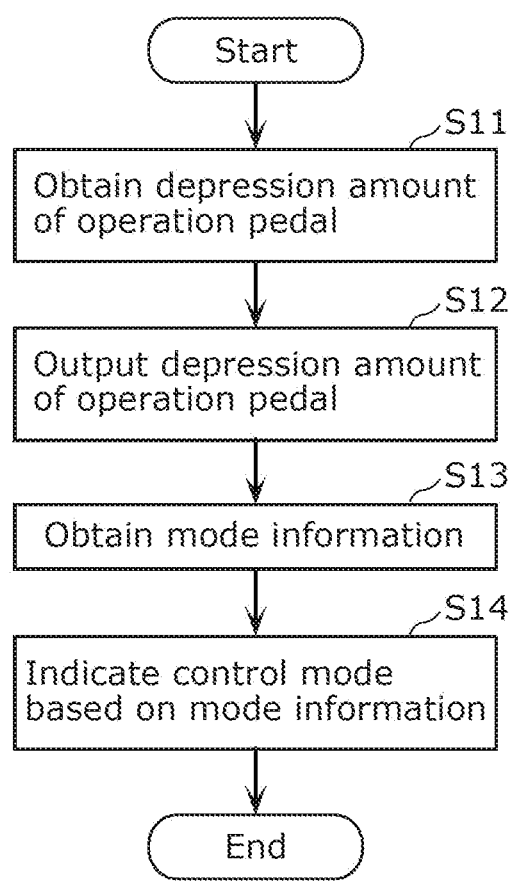
FIG. 3 is a flowchart showing an example operation of the remote-control device according to the embodiment.

FIG. 3 is a flowchart showing an example operation of remote-control device 100 according to the embodiment. Note that remote-control device 100 is an example of the "computer" that executes the information processing method according to the embodiment. FIG. 3 is thus also a flowchart showing an example information processing method according to the embodiment.

First, remote-control device 100 obtains an operation amount of an operation related to a speed (i.e., the depression amount of the operation pedal) by operation UI 101 for remote control of a vehicle (step S11).

Next, remote-control device 100 outputs the obtained depression amount of the operation pedal (specifically, a digital value indicating the depression amount of the operation pedal) to vehicle control device 10 (step S12).

Then, remote-control device 100 obtains the mode information indicating whether the control mode of the vehicle speed is the accelerator control mode or the speed control mode (step S13).

After that, remote-control device 100 indicates the control mode of the vehicle speed based on the obtained mode information (step S14). Here, example indications of the control mode will be described with reference to FIGS. 4A and 4B.

Figure 4A:
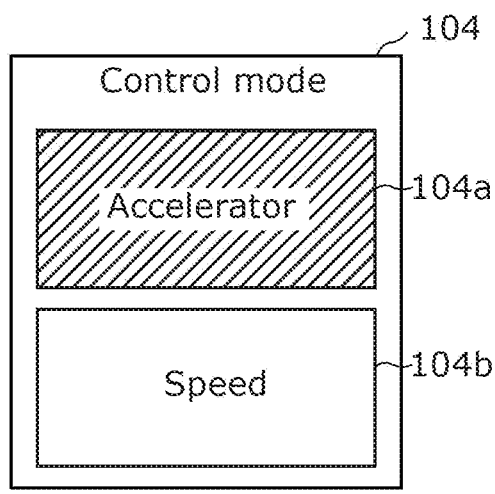
FIG. 4A shows an example indication of an accelerator control mode.

FIG. 4A shows an example indication of the accelerator control mode.

Figure 4B:
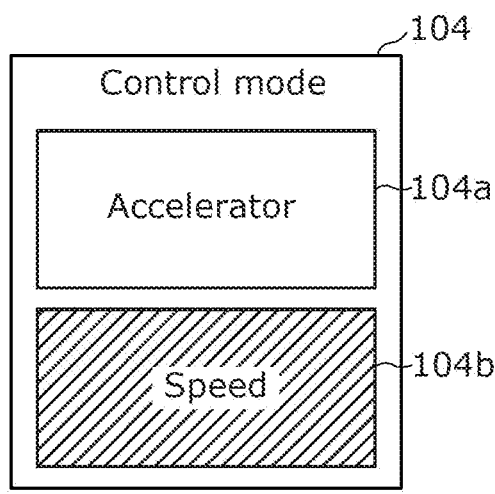
FIG. 4B shows an example indication of a speed control mode.

FIG. 4B shows an example indication of the speed control mode.

Each of FIGS. 4A and 4B shows, as indicator 104, a display device including areas 104a and 104b. Area 104a emits light when the control mode is the accelerator control mode, whereas area 104b emits light when the control mode is the speed control mode.

As shown in FIG. 4A, upon obtainment of the mode information indicating that the control mode is the accelerator control mode, remote-control device 100 turns on the light in area 104a of indicator 104. Area 104a is represented by letters such as "Accelerator", for example. Being turned on, area 104a allows a viewer of indicator 104 (e.g., the operator of operation UI 101) to recognize that the control mode of the vehicle speed of the vehicle under the remote operation is the accelerator control mode, Note that the indication information indicating the accelerator control mode may be expressed as an "amount of movement", for example.

As shown in FIG. 4B, upon obtainment of the mode information indicating that the control mode is the speed control mode, remote-control device 100 turns on the light in area 104b of indicator 104, Area 104b is represented by letters such as "Speed", for example. Being turned on, area 104b allows, for example, the operator of operation UI 101 to recognize that the control mode of the vehicle speed of the vehicle under the remote operation is the speed control mode.

In this manner, the operator of operation UI 101 for remote control of a vehicle recognizes the control mode of the vehicle speed. Note that an indicator (e.g., a lamp) may be further included to cause the operator to recognize a shift of the control mode.

As described above, indicator 104 may also function to receive an input, and areas 104a and 104b may be buttons. The buttons may be icons of the buttons displayed on a touch panel display, for example, or transparent or translucent mechanical buttons each including a light emitting element therein. For example, upon receipt of an input via such a button, indicator 104 may obtain a shift operation as an instruction to shift the control mode of the vehicle speed, generate instruction information based on the shift operation, and output the instruction information via communicator 103 to vehicle control device 10. This allows a manual shift of the control mode of the vehicle speed. For example, this is advantageous when each operator has a different preference for a control mode based on his or her operation habits.

Now, the constituent elements of vehicle control device 10 will be described.

Figure 5:
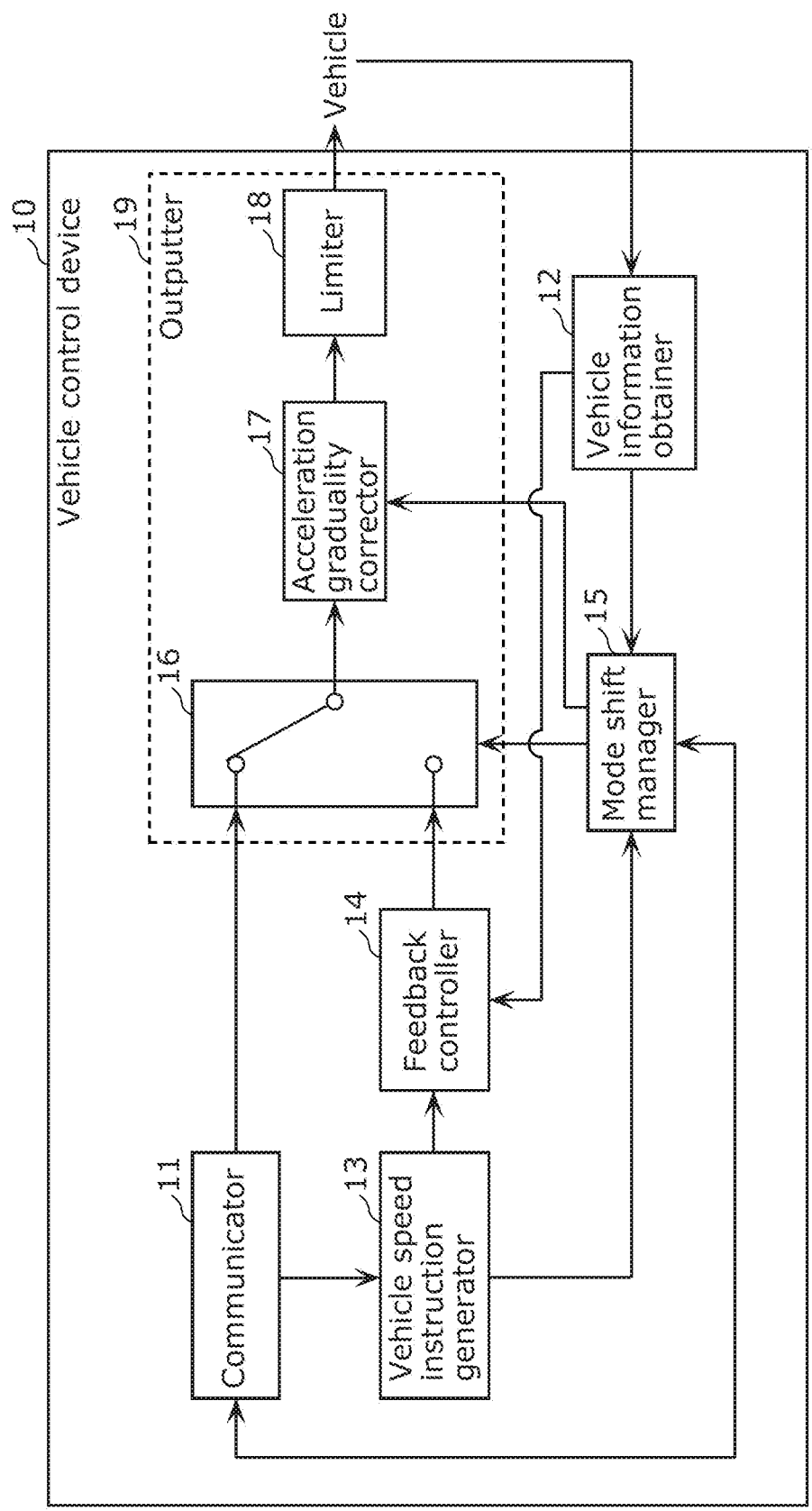
FIG. 5 is a block diagram showing an example of a vehicle control device according to the embodiment.

FIG. 5 is a block diagram showing an example of vehicle control device 10 according to the embodiment.

Vehicle control device 10 includes communicator 11, vehicle information obtainer 12, vehicle speed instruction generator 13, feedback controller 14, mode shift manager 15, and outputter 19.

For example, vehicle control device 10 is a computer including a processor, a communication interface, and a memory, for example. The memory includes a read-only memory (ROM) and a random-access memory (RAM), for example, each storing the programs to be executed by the processor. Each of communicator 11, vehicle information obtainer 12, vehicle speed instruction generator 13, feedback controller 14, mode shift manager 15, and outputter 19 is a processor that executes the programs stored in the memory, or a communication interface, for example.

Communicator 11 is a communication interface for communications with remote-control device 100 and server device 200. Note that vehicle control device 10 may include both a communication interface for remote-control device 100 and a communication interface for server device 200. Communicator 11 is an example of the "second obtainer" that obtains the operation amount of the operation related to the speed (i.e., the depression amount of the operation pedal) by operation UI 101 for remote control of a vehicle. Communicator 11 outputs, to remote-control device 100, the mode information indicating whether the control mode of the vehicle speed is the accelerator control mode or the speed control mode. In addition, communicator 11 obtains, from server device 200, the conditions for a shift of the control mode of the vehicle speed. Communicator 11 also obtains the instruction information according to the shift operation as an instruction to shift the control mode from remote-control device 100.

Vehicle information obtainer 12 obtains the vehicle information on the vehicle from various electronic control units (ECUs) connected to an on-vehicle network (e.g., a controller area network (CAN)) inside the vehicle, for example. Vehicle information obtainer 12 is an example of the "first obtainer" that obtains a first moving speed that is the current vehicle speed (i.e., the actual vehicle speed). Note that the "current vehicle speed" is the latest vehicle speed obtained by vehicle information obtainer 12 from the on-vehicle network and is not necessarily the exact current speed.

Vehicle speed instruction generator 13 is an example of the "generator" that generates a second moving speed based on the depression amount of the operation pedal as obtained by communicator 11. That is, vehicle speed instruction generator 13 converts the depression amount of the operation pedal to the second moving speed that is the speed corresponding to the depression amount (i.e., the speed as the vehicle is instructed from operation UI 101).

Feedback controller 14 obtains the current vehicle speed from vehicle information obtainer 12 and performs feedback control. Accordingly, the speed according to the instruction generated by vehicle speed instruction generator 13 to the vehicle is converted into the vehicle speed control amount. At this time, the vehicle speed is maintained at the speed as the vehicle is instructed and generated by vehicle speed instruction generator 13.

Mode shift manager 15 manages the control mode of the vehicle speed. Set as the conditions for a shift of the control mode are the thresholds of the current vehicle speed, specifically, first and second thresholds. In accordance with the magnitude relation between the current vehicle speed and the first and second thresholds, the control mode shifts. Although details will be described later, the conditions for a shift of the control mode are determined by server device 200. Mode shift manager 15 obtains, via communicator 11, the conditions for a shift of the control mode determined by server device 200. Mode shift manager 15 obtains the current vehicle speed from vehicle information obtainer 12. In accordance with the magnitude relation between the current vehicle speed and the first and second thresholds, mode shift manager 15 shifts the control mode to the accelerator control mode or the speed control mode. Mode shift manager 15 also obtains the speed as the vehicle is instructed by vehicle speed instruction generator 13. In accordance with the magnitude relation between the current vehicle speed and the speed as the vehicle is instructed, mode shift manager 15 shifts the control mode to the accelerator control mode or the speed control mode. Specifically, mode shift manager 15 is an example of the "shift controller" that shifts the control mode as follows. If the current vehicle speed is lower than the first threshold and the speed as the vehicle is instructed is lower than the current vehicle speed, the control mode shifts to the accelerator control mode. If the current vehicle speed is higher than or equal to the second threshold and the speed as the vehicle is instructed is higher than the current vehicle speed, the control mode of the vehicle speed shifts to the speed control mode. The accelerator control mode is an example of the "first mode" of outputting the depression amount of the operation pedal as the speed control amount that is the amount of controlling the speed of the vehicle. The speed control mode is an example of the "second mode" of outputting the control amount converted from the speed as the vehicle is instructed as the vehicle speed control amount.

In addition, mode shift manager 15 shifts the control mode in accordance with the instruction information obtained by communicator 11 from remote-control device 100.

Outputter 19 includes switch 16, acceleration graduality corrector 17, and limiter 18.

Switch 16 includes, for example, a common terminal, a first selection terminal, and a second selection terminal. The common terminal is connected to the on-vehicle network of the vehicle. Here, the common terminal is connected via acceleration graduality corrector 17 and limiter 18, for example, to a CAN of the vehicle, for example. The first selection terminal is connected to communicator 11, whereas the second selection terminal is connected to feedback controller 14. If the current control mode is the accelerator control mode, switch 16 connects the common terminal to the first selection terminal. If the current control mode is the speed control mode, switch 16 connects the common terminal to the second selection terminal. Note that a single pole double throw (SPOT) switch is raised here as an example of switch 16. The example configuration of switch 16 is not limited thereto as long as allowing a selection between the connection between the on-vehicle network of the vehicle and communicator 11 and the connection between the on-vehicle network of the vehicle and feedback controller 14. For example, two single pole single throw (SPST) switches may be used as switch 16.

Acceleration graduality corrector 17 is an example of the "setter" that sets the upper limit of the vehicle speed control amount based on the current vehicle speed, when the control mode is shifted and the difference between the current vehicle speed and the speed as the vehicle is instructed is larger than the third threshold. Details of acceleration graduality corrector 17 will be described later.

Limiter 18 controls the vehicle speed control amount between predetermined upper and lower limits to improve the sitting comfort of a vehicle seat. Limiter 18 limits the vehicle speed control amount under a predetermined amount and its change amount.

At a change in the connection using switch 16, for example, outputter 19 outputs the following. If the current vehicle speed is lower than the first threshold, outputter 19 outputs the depression amount of the operation pedal as the vehicle speed control amount. If the current vehicle speed is higher than or equal to the second threshold, outputter 19 outputs the control amount converted from the speed as the vehicle is instructed as the vehicle speed control amount. Specifically, outputter 19 outputs the vehicle speed control amount in accordance with the accelerator control mode or the speed control mode as managed by mode shift manager 15. Outputter 19 also outputs the vehicle speed control amount in accordance with the upper limit of the vehicle speed control amount set by acceleration graduality corrector 17.

Now, an operation of vehicle control device 10 will be described.

Figure 6:
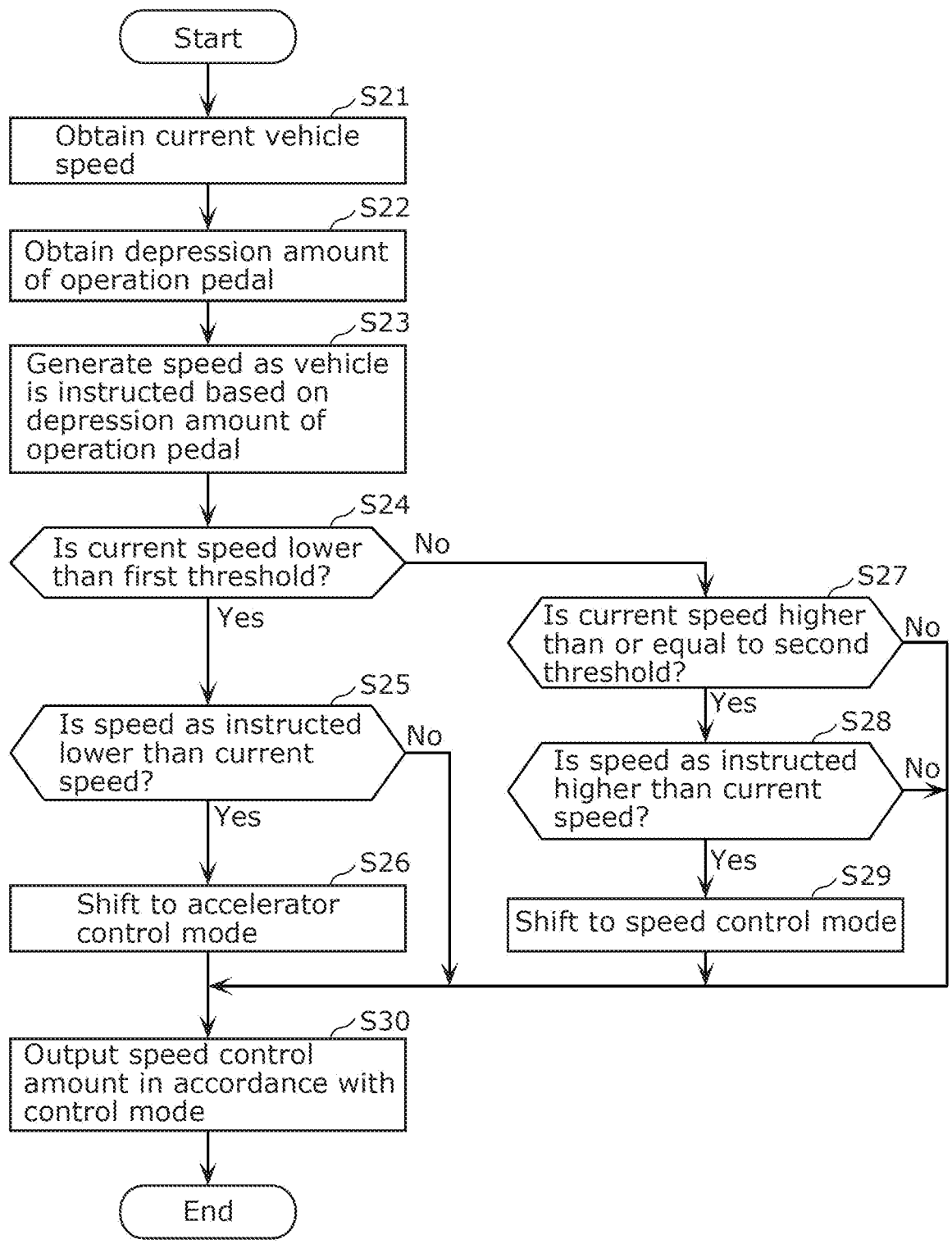
FIG. 6 is a flowchart showing an example operation of the vehicle control device according to the embodiment.

FIG. 6 is a flowchart showing an example operation of vehicle control device 10 according to the embodiment.

Vehicle information obtainer 12 obtains the current vehicle speed (step S21).

Next, communicator 11 obtains the depression amount of the operation pedal (step S22). When the brake pedal of operation UI 101 is depressed, communicator 11 obtains the information indicating the depression of the brake pedal of operation UI 101.

Figure 7:
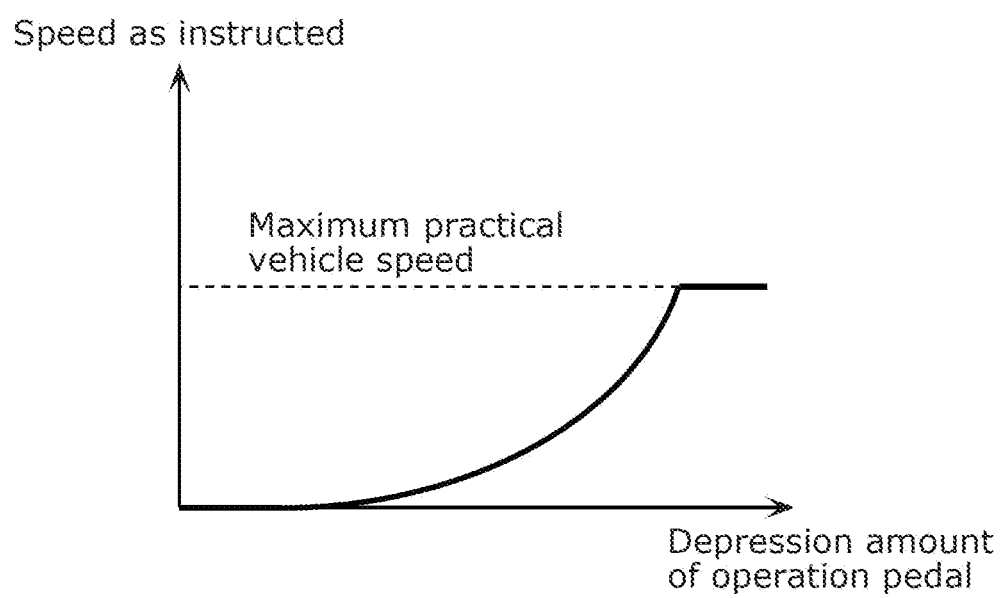
FIG. 7 is a graph showing a correspondence between a depression amount of an operation pedal and a speed as a vehicle is instructed.

Then, vehicle speed instruction generator 13 generates the speed as the vehicle is instructed based on the depression amount of the operation pedal (step S23). For example, vehicle speed instruction generator 13 generates the speed as the vehicle is instructed, in accordance with the depression amount of the operation pedal to set the upper limit of the depression amount of the operation pedal to be equal to the upper limit of the vehicle speed. This will be described with reference to FIG. 7, FIG. 7 is a graph showing a correspondence between the depression amount of the operation pedal and the speed as the vehicle is instructed. The horizontal axis represents the depression amount of the operation pedal, whereas the vertical axis represents the speed as the vehicle is instructed. For example, the upper limit of the depression amount of the operation pedal is found at the right end of the horizontal axis.

As shown in FIG. 7, the following are found, With an increasing depression amount of the operation pedal, the speed as the vehicle is instructed increases. At the upper limit of the depression amount of the operation pedal, the speed as the vehicle is instructed is the maximum practical vehicle speed. The maximum practical vehicle speed is, for example, the upper limit of the vehicle speed when the vehicle is under a remote control. In this manner, the speed as the vehicle is instructed is generated to set the upper limit of the depression amount of the operation pedal to be equal to the upper limit of the vehicle speed. Accordingly, the speed as the vehicle is instructed is kept under the upper limit of the vehicle speed as of the remote control. An example is shown in FIG. 7 where the speed as the vehicle is instructed reaches the maximum practical vehicle speed before the depression amount of the operation pedal reaches the upper limit. Alternatively, the correspondence between the depression amount of the operation pedal and the speed as the vehicle is instructed may be adjusted so that the speed as the vehicle is instructed reaches the maximum practical vehicle speed just when the depression amount of the operation pedal reaches the upper limit.

Referring back to the description with reference to FIG. 6, mode shift manager 15 then determines whether the current vehicle speed is lower than the first threshold (step S24).

If the current vehicle speed is lower than the first threshold (Yes in step S24), mode shift manager 15 determines whether the speed as the vehicle is instructed is lower than the current vehicle speed (step S25).

If the speed as the vehicle is instructed is lower than the current vehicle speed (Yes in step S25), mode shift manager 15 shifts the control mode to the accelerator control mode. Specifically, if the current control mode is the speed control mode, mode shift manager 15 shifts the control mode to the accelerator control mode. If the current control mode has been already the accelerator control mode, mode shift manager 15 maintains the accelerator control mode.

Assume that the speed as the vehicle is instructed is higher than or equal to the current vehicle speed (No in step S25). If the current control mode is the accelerator control mode, mode shift manager 15 maintains the accelerator control mode. If the current control mode is the speed control mode, mode shift manager 15 maintains the speed control mode.

The conditions for a shift from the speed control mode to the accelerator control mode described in steps S24 to S26 will be described here in detail with reference to FIG. 8A.

Figure 8A:
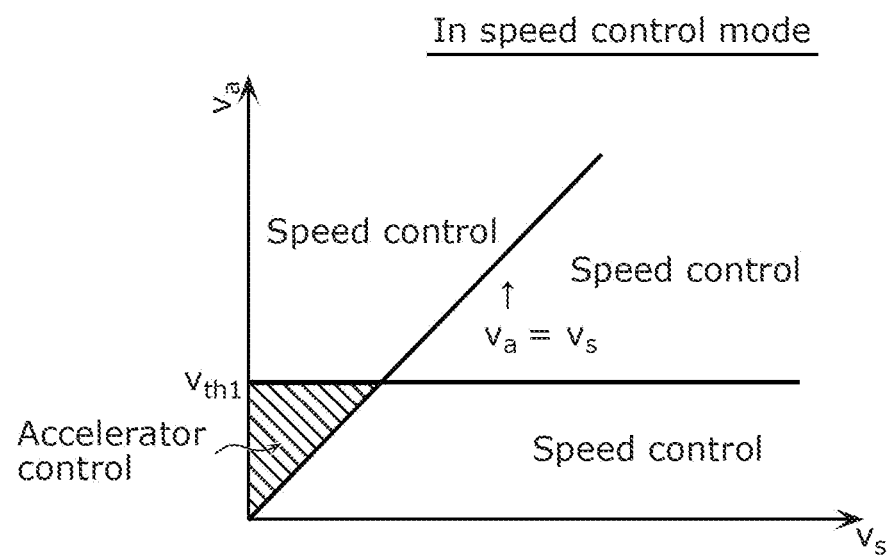
FIG. 8A illustrates conditions for a shift from a speed control mode to an accelerator control mode.

FIG. 8A illustrates the conditions for the shift from the speed control mode to the accelerator control mode. The vertical axis represents the current vehicle speed, whereas the horizontal axis represents the speed as the vehicle is instructed. In addition, $v_a$ denotes the current vehicle speed, $v_s$ denotes the speed as the vehicle is instructed, and $v_{th1}$ denotes the first threshold.

If the current control mode is the speed control mode, the conditions for the shift from the speed control mode to the accelerator control mode are: $v_a<v_{th1}$ and $v_s<v_a$. That is, where the current vehicle speed and the speed as the vehicle is instructed are within the hatched area in FIG. 8A, the control mode shifts from the speed control mode to the accelerator control mode. In other words, if the current vehicle speed is higher than or equal to the first threshold, the control mode does not shift from the speed control mode to the accelerator control mode, Assume that the speed as the vehicle is instructed is higher than or equal to the current vehicle speed, even if the current vehicle speed is lower than the first threshold. In this case, the control mode does not shift from the speed control mode to the accelerator control mode, Note that the control mode may shift from the speed control mode to the accelerator control mode, if the brake pedal of operation UI 101 is depressed and the current control mode is the speed control mode.

Assume that the current vehicle speed lower than the first threshold is the only condition for a shift to the accelerator control mode. When the vehicle speed is around the first threshold, the control mode may shift frequently, There is also the condition that the speed as the vehicle is instructed is lower than the current vehicle speed, which reduces the shifts of the control mode.

Referring back to the description with reference to FIG. 6, if the current vehicle speed is higher than or equal to the first threshold (No in step S24), mode shift manager 15 determines whether the current vehicle speed is higher than or equal to the second threshold (step S27).

If the current vehicle speed is higher than or equal to the second threshold (Yes in step S27), mode shift manager 15 determines whether the speed as the vehicle is instructed is higher than the current vehicle speed (step S28).

If the speed as the vehicle is instructed is higher than the current vehicle speed (Yes in step S28), mode shift manager 15 shifts the control mode to the speed control mode (step S29). Specifically, if the current control mode is the accelerator control mode, mode shift manager 15 shifts the control mode to the speed control mode. If the current control mode has been already the speed control mode, mode shift manager 15 maintains the speed control mode.

Assume that the current vehicle speed is lower than the second threshold (No in step S27) or the speed as the vehicle is instructed is lower than or equal to the current vehicle speed (No in step S28). If the current control mode is the accelerator control mode, mode shift manager 15 maintains the accelerator control mode. If the current control mode is the speed control mode, mode shift manager 15 maintains the speed control mode.

The conditions for a shift from the accelerator control mode to the speed control mode described in steps S27 to S29 will be described here in detail with reference to FIG. 8B.

Figure 8B:
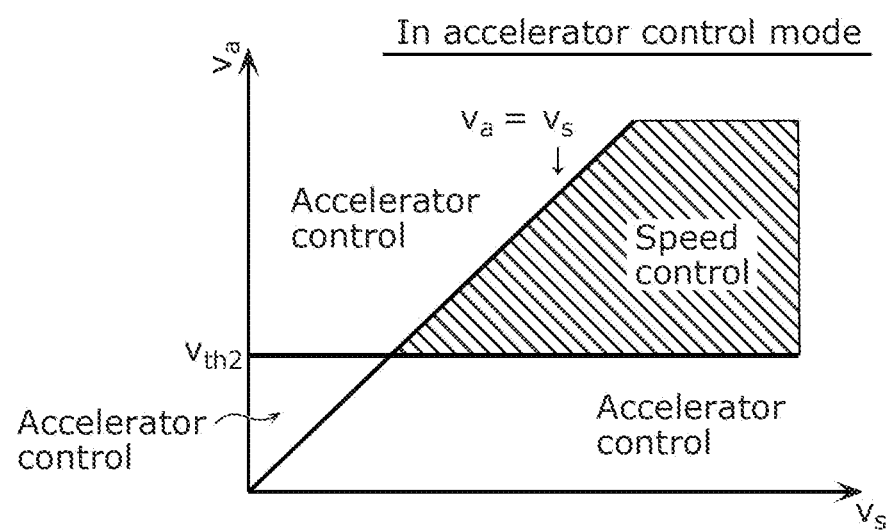

FIG. 8B illustrates the conditions for the shift from the accelerator control mode to the speed control mode. The vertical axis represents the current vehicle speed, whereas the horizontal axis represents the speed as the vehicle is instructed. In addition, $v_{th2}$ denotes the second threshold.

If the current control mode is the accelerator control mode, the conditions for the shift from the accelerator control mode to the speed control mode are: $v_a>v_{th2}$ and $v_s>v_a$. That is, where the current vehicle speed and the speed as the vehicle is instructed are within the hatched area in FIG. 8B, the control mode shifts from the accelerator control mode to the speed control mode. In other words, if the current vehicle speed is lower than the second threshold, the control mode does not shift from the accelerator control mode to the speed control mode, Assume that the speed as the vehicle is instructed is lower than or equal to the current vehicle speed, even if the current vehicle speed is higher than or equal to the second threshold. In this case, the control mode does not shift from the accelerator control mode to the speed control mode.

Assume that the current vehicle speed higher than or equal to the second threshold is the only condition for a shift to the speed control mode. When the vehicle speed is around the second threshold, the control mode may shift frequently. There is also the condition that the speed as the vehicle is instructed is higher than the current vehicle speed, which reduces the shifts of the control mode.

The first and second thresholds are not particularly limited. For example, the first threshold is 3 km/h and the second threshold is 2 km/h. Note that the first and second thresholds may be the same value.

Now, a specific example shift of the control mode will be described with reference to FIG. 9.

FIG. 9 illustrates the specific example shift of the control mode. In FIG. 9, the upper part shows a graph representing a change in the vehicle speed over time, whereas the lower part shows a graph representing a change in the depression amount of the operation pedal over time.

In time zone (1) shown in FIG. 9, the operation pedal is depressed with the depression amount corresponding to speed $v_s$ as instructed that is higher than second threshold $v_{th2}$ for remote control of a parking vehicle, and the vehicle speed gradually increases. For example, assume that the control mode is the accelerator control mode at a start of the vehicle, Time zone (1) is the stage at which the vehicle starts with a speed increasing from 0 km/h. Speed $v_s$ as the vehicle is instructed is thus higher than current vehicle speed $v_a$ that increases every moment in time zone (1). Once current vehicle speed $v_a$ becomes second threshold $v_{th2}$ or more, the conditions $v_a > v_{th2}$ and $v_s > v_a$ are satisfied. Accordingly, the control mode shifts from the accelerator control mode to the speed control mode.

In time zone (2) shown in FIG. 9, the vehicle speed reaches the speed as the vehicle is instructed, feedback control is performed in the speed control mode, and the vehicle speed is kept at the speed as instructed. After that, the operation pedal is depressed with the depression amount corresponding to speed $v_s$ as instructed lower than first threshold $v_t$hi, and the vehicle speed gradually decreases. Time zone (2) is the stage at which the vehicle travels at a certain speed. Vehicle speed $v_a$ that decreases every moment in time zone (2) is higher than first threshold $v_t$hi. Once current vehicle speed $v_a$ becomes lower than first threshold $v_{th1}$, the conditions $v_a < v_{th1}$ and $v_s < v_a$ are satisfied. Accordingly, the control mode shifts from the speed control mode to the accelerator control mode.

Then, in time zone (3) shown in FIG. 9, the operation pedal is released from the depression so that the vehicle stops.

Note that the control mode of the vehicle speed automatically shifts in accordance with the magnitude relation between the current vehicle speed and the first and second thresholds and the magnitude relation between the speed as the vehicle is instructed and the current vehicle speed. Alternatively, the control mode may be shifted manually in accordance with the control mode as instructed by the operator of operation UI 101 and indicated by the instruction information.

Referring back to the description with reference to FIG. 6, outputter 19 outputs the vehicle speed control amount in accordance with the accelerator control mode or the speed control mode (step S30), That is, if the control mode is the accelerator control mode, outputter 19 outputs the depression amount of the operation pedal as the vehicle speed control amount. If the control mode is the speed control mode, outputter 19 outputs, as the speed control amount, the control amount converted by feedback control from the speed as the vehicle is instructed and generated based on the depression amount of the operation pedal. Note that outputter 19 may output the speed control amount in accordance with the upper limit of the speed control amount set by acceleration graduality corrector 17. Now, the setting of the upper limit of the speed control amount by acceleration graduality corrector 17 will be described with reference to FIG. 10.

Figure 10:
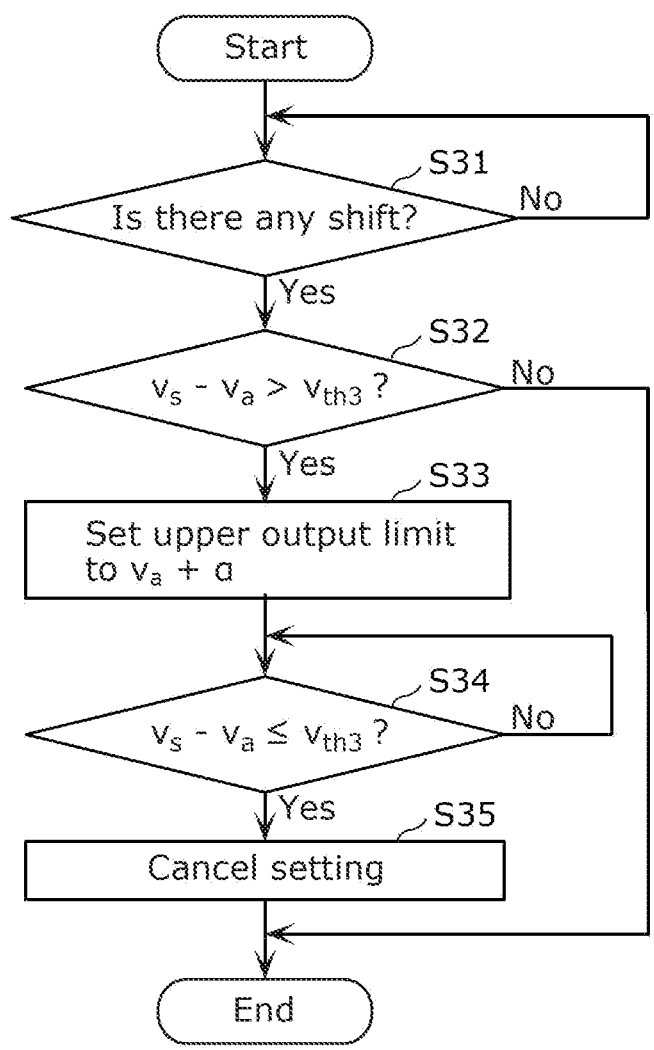
FIG. 10 is a flowchart showing an example operation of an acceleration graduality corrector according to the embodiment.

FIG. 10 is a flowchart showing an example operation of acceleration graduality corrector 17 according to the embodiment. Here, $v_{th3}$ denotes a third threshold.

First, acceleration graduality corrector 17 determines whether there is a shift of the control mode (step S31). If there is no shift of the control mode (No in step S31), acceleration graduality corrector 17 repeats the processing in step S31 until there is a shift of the control mode.

If there is a shift of the control mode (Yes in step S31), acceleration graduality corrector 17 determines whether the expression $v_s - v_a > v_{th3}$ is satisfied (step S32). That is, acceleration graduality corrector 17 determines whether the speed as the vehicle is instructed is much higher than the current vehicle speed. Note that the third threshold is not particularly limited and set as appropriate. At a shift of the control mode, assume that the difference between the current vehicle speed and the speed as the vehicle is instructed is larger than the third threshold, and the speed control amount according to the control mode after the shift is unchanged output. At this time, the vehicle may accelerate suddenly and run into danger. The determination in step S32 is thus made.

If $v_s - v_a > v_{th3}$ (Yes in step S32), acceleration graduality corrector 17 sets the upper limit of the vehicle speed control amount to be output to $v_a + a$ (step S33). That is, acceleration graduality corrector 17 sets the upper limit of the vehicle speed control amount based on the current vehicle speed, Here, a is set as appropriate. If the difference between the current vehicle speed and the speed as the vehicle is instructed is larger than the third threshold, the upper limit of the vehicle speed control amount is set based on the current vehicle speed. This reduces the sudden acceleration of the vehicle at the shift to the control mode and keeps the gradual acceleration of the vehicle.

On the other hand, if $v_s - v_t \leq v_{th3}$ (No in step S32), acceleration graduality corrector 17 sets no upper limit of the vehicle speed control amount and ends the processing.

After setting the upper limit of the vehicle speed control amount in step S33, acceleration graduality corrector 17 determines whether the expression $v_s - v_a \leq v_{th3}$ is satisfied (step S34). That is, acceleration graduality corrector 17 determines whether the current vehicle speed is reaching the speed as the vehicle is instructed. If $v_s - v_a > v_{th3}$ (No in step S34), acceleration graduality corrector 17 repeats the processing in step S34 until $v_s - v_a \leq v_{th3}$ is satisfied.

If $v_s - v_a \leq v_{th3}$ is satisfied (Yes in step S34), acceleration graduality corrector 17 cancels the upper limit of the vehicle speed control amount (step S35). This is because the vehicle speed has increased to some extent to the speed as the vehicle is instructed and the vehicle will not accelerate suddenly even after the cancel of the upper limit of the vehicle speed control amount.

Now, the constituent elements of server device 200 will be described.

Figure 11:
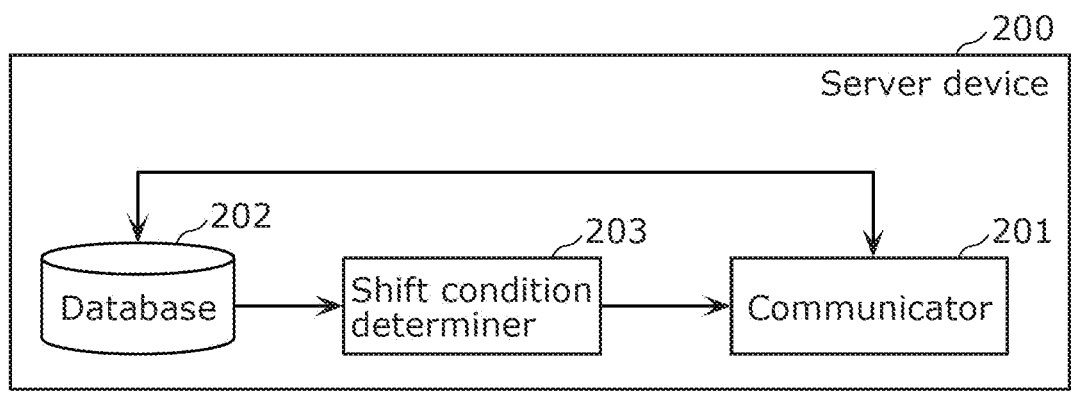
FIG. 11 is a block diagram showing an example of a server device according to the embodiment.

FIG. 11 is a block diagram showing an example of server device 200 according to the embodiment.

Server device 200 includes communicator 201, database 202, and shift condition determiner 203.

For example, server device 200 is a computer including a processor, a communication interface, and a memory, for example. The memory includes a ROM and a RAM, for example, each storing the programs to be executed by the processor. Each of communicator 201, database 202, and shift condition determiner 203 is a processor that executes the programs stored in the memory, a memory, or a communication interface, for example.

Communicator 201 is a communication interface for communications with vehicle control device 10 and remote-control device 100. Note that server device 200 may include both a communication interface for vehicle control device 10 and a communication interface for remote-control device 100. Communicator 201 obtains the operation history output from remote-control device 100. The operation history includes the operation amount history related to at least the speed (i.e., the depression amount of the operation pedal). The operation history may also include the operation amount history related to the moving direction (i.e., the operation amount of the steering wheel). The operation history may further include the history of the shift operation as an instruction to shift the control mode of the vehicle speed. Communicator 201 may also obtain the vehicle speed history from vehicle control device 10. Communicator 201 outputs, to vehicle control device 10, the conditions for a shift of the control mode determined by shift condition determiner 203.

Database 202 stores the operation history, the vehicle speed history, and other histories obtained by communicator 201.

Shift condition determiner 203 determines the conditions for a shift of the control mode based on the operation history or vehicle speed history stored in database 202. A specific example method of determining the shift conditions will be described later.

Now, an operation of server device 200 will be described.

Figure 12:
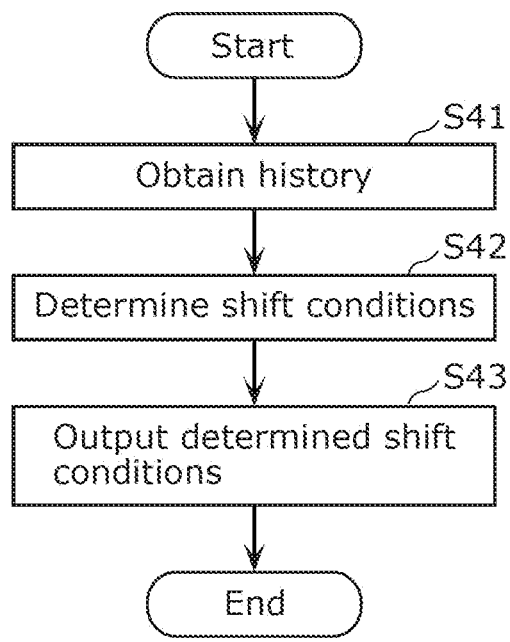
FIG. 12 is a flowchart showing an example operation of the server device according to the embodiment.

FIG. 12 is a flowchart showing an example operation of server device 200 according to the embodiment. Note that server device 200 is an example of the "computer" that executes the information processing method according to the embodiment, FIG. 12 is thus also a flowchart showing an example information processing method according to the embodiment.

First, server device 200 obtains the operation history or vehicle speed history of operation UI 101 (step S41). The obtained history is accumulated in database 202.

Next, server device 200 determines the conditions for a shift of the control mode based on the operation history or vehicle speed history of operation UI 101 (step S42). Set as the conditions for a shift of the control mode are the thresholds of the current vehicle speed as described above, specifically, the first and second thresholds. Now, a specific example method of determining the shift conditions will be described with reference to FIGS. 13A to 14B.

FIG. 13A is a table showing an example remote-operation history.

Figure 13B:
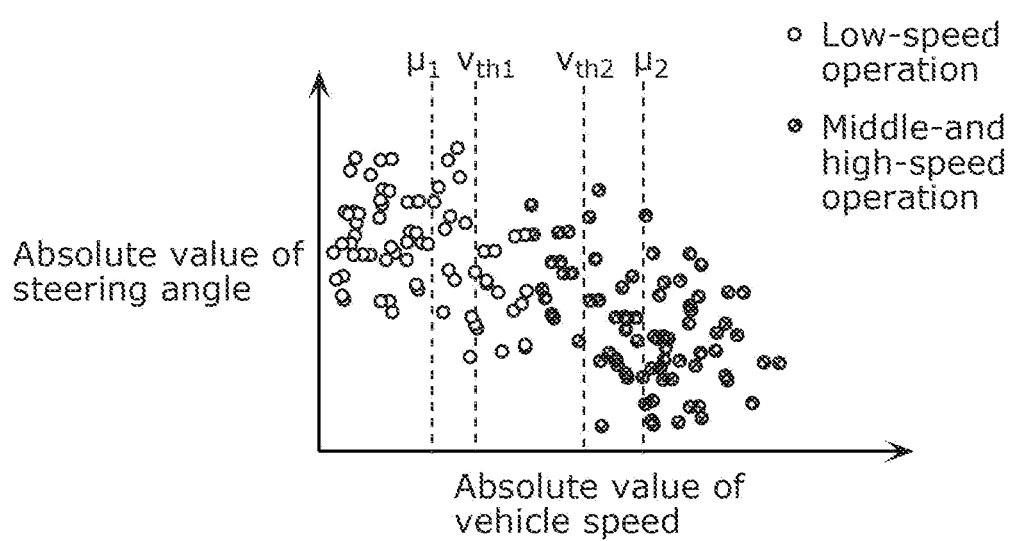
FIG. 13A is a table showing an example remote-operation history.

FIG. 13B illustrates an example method of determining the shift conditions.

As shown in FIG. 13A, the remote-operation history includes the history of each operator of operation UI 101. Specifically, the remote-operation history includes the type of the vehicle under the remote control of the operator, the remote-operation event, and travel log data. The travel log data includes the amounts of operation of the accelerator pedal, brake pedal, and steering wheel of operation UI 101 in each certain period and the vehicle speed information.

As shown in FIG. 13B, for example, a clustering analysis is performed for events and operators to be classified into a cluster of low-speed operations and a cluster of middle- and high-speed operations. Accordingly, the first threshold is obtained from the equation $v_{th1}=\mu_1+\sigma_1$. Here, $\mu_1$ denotes the average of the speed in the cluster of the low-speed operations, and $\sigma_1$ denotes the standard deviation of the speed in the duster of the low-speed operations. On the other hand, the second threshold is obtained from the equation $v_{th2}=\mu_2-\sigma_2$. Here, $\mu_2$ denotes the average of the speed in the cluster of the middle- and high-speed operations, and $\sigma_2$ in the cluster of the middle- and high-speed operations.

FIG. 14A is a table showing another example remote-operation history.

Figure 14B:
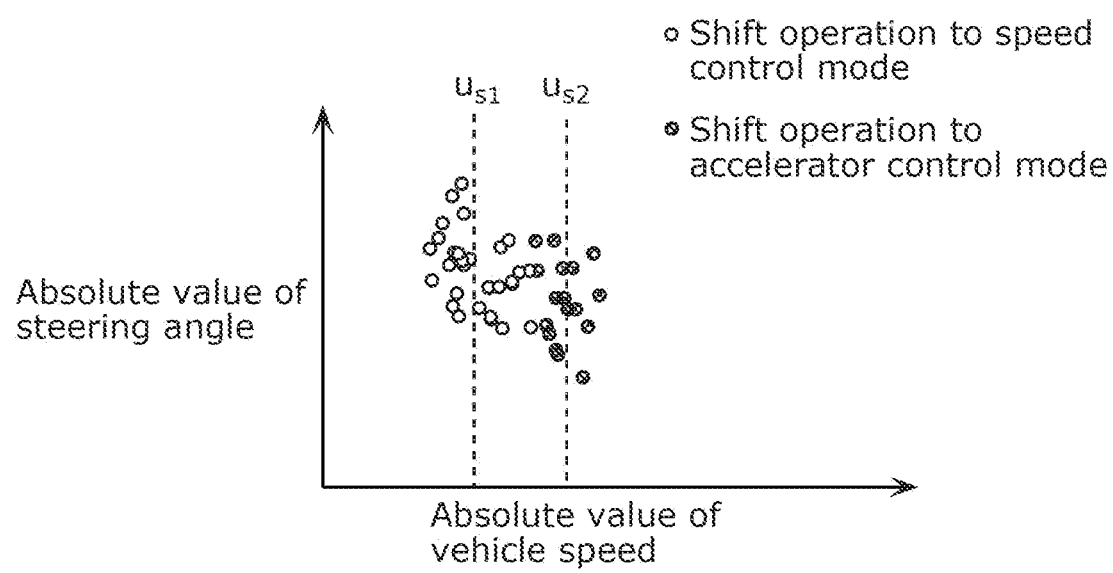
FIG. 14A is a table showing another example remote-operation history.

FIG. 14B illustrates another example method of deter ng the shift conditions.

As shown in FIG. 14A, the remote-operation history includes the history of each operator of operation UI 101. Specifically, the remote-operation history includes the type of the vehicle under the remote control of the operator, the remote-operation event, and shift operation data. The shift operation data includes the amounts of operation of the accelerator pedal, brake pedal, and steering wheel of operation UI 101 at a time of the shift operation as an instruction to shift the control mode and the vehicle speed information.

As shown in FIG. 14B, for example, a statistical analysis is performed on the shift operations for events and operators in addition to the calculation described above with reference to FIG. 13B to update the first and second thresholds, Specifically, the first threshold is obtained from the equation $v_{th1}=(w_1\,(\rho_1+\sigma_1)+w_2\,(\mu_{s1}))/(w_1+w_2)$. Here, $\mu_{s1}$ denotes the average of the speed at the time of the shift operation to the speed control mode, $w_1$ denotes the weight in the mode described above with reference to FIG. 13B, and w2 denotes the weight of a result of the analysis of the shift operation. On the other hand, the second threshold is obtained from the equation $v_{th2}=(w_1\,(\mu_2-\sigma_2)+w_2\,(\mu_{s2}))/(w_1+w_2)$. Here, $\mu_{s2}$ denotes the average of the speed at the time of the shift operation to the accelerator control mode.

Server device 200 may identify the operator of operation UI 101, obtain a specific operation history associated with the identified operator, and determine the first and second thresholds based on the specific operation history. This allows the determination on the first and second thresholds for each operator of operation UI 101.

Referring back to the description with reference to FIG. 12, server device 200 outputs the determined shift conditions to vehicle control device 10 (step S43). Specifically, server device 200 outputs, to vehicle control device 10, the first and second thresholds determined based on the operation history or the vehicle speed history. Accordingly, communicator 11 of vehicle control device 10 obtains the first and second thresholds determined based on at least the depression amount history of the operation pedal or the vehicle speed history, Specifically, communicator 11 obtains the first and second thresholds determined based on the following history. The history includes the operation amount history of the steering wheel, the history of the shift operation as an instruction to shift the control mode, or further, the operation history associated with the operator of operation UI 101. Server device 200 may output the first and second thresholds determined on a specific operation history associated with the operator of operation UI 101, Communicator 11 may obtain the first and second thresholds determined based on the operation history associated with the operator of operation UI 101.

In this manner, server device 200 determines the first and second thresholds based on the operation history. Server device 200 then outputs the first and second thresholds determined in this manner to vehicle control device 10. This allows determination whether to output the depression amount of the operation pedal unchanged as a speed control amount or the control amount converted from the speed as the vehicle is instructed as the speed control amount.

For example, if there is a larger amount of operation of the operation steering wheel, the vehicle is assumed to be under a fine operation and move at a lower speed. Thus, the first threshold can be determined based on the depression amount history of the operation pedal or the vehicle speed history as of the larger operation amount of the steering wheel. If there is a smaller amount of operation of the operation steering wheel, the vehicle is assumed to be under no fine operation and move at a middle or higher speed. Thus, the second threshold can be determined based on the depression amount history of the operation pedal or the vehicle speed history as of the smaller operation amount of the steering wheel.

For example, if there is an instruction to shift the control mode of the vehicle speed to the accelerator control mode, the vehicle is assumed to be under a fine operation and move at a lower speed. Thus, the first threshold can be determined based on the depression amount history of the operation pedal or the vehicle speed history as of the instruction to shift to the accelerator control mode. If there is an instruction to shift the control mode to the speed control mode, the vehicle is assumed to be under no fine operation and move at a middle or higher speed. Thus, the second threshold can be determined based on the depression amount history of the operation pedal or the vehicle speed history as of the instruction to shift to the speed control mode.

As described above, if the current vehicle speed is higher than or equal to the second threshold (e.g., when the vehicle moves at a middle or higher speed), a fine operation is difficult to perform and even a poor responsiveness of operation UI 101 to the operation is less problematic. Accordingly, if the current vehicle speed is higher than or equal to the second threshold, a speed control amount according to the speed as the vehicle is instructed and generated based on the depression amount of the operation pedal is output in view of a communication delay or other problems. On the other hand, if the current vehicle speed is lower than the first threshold (e.g., when the vehicle moves at a lower speed), a fine operation is easy to perform and a poor responsiveness of operation UI 101 to the operation is more problematic. Accordingly, if the current vehicle speed is lower than the first threshold, the depression amount of the operation pedal is unchanged output as the speed control amount. In this manner, a most suitable speed control amount is output in accordance with the current vehicle speed. Even at a decreasing vehicle speed, the operability of vehicle by operation UI 101 is less degraded.

Other Embodiments

The information processing device (i.e., vehicle control device 10) and the information processing method according to one or more aspects of the present disclosure have been described above based on the embodiment. The present disclosure is however not limited to the embodiment. One or more aspects of the present disclosure include other embodiments, such as those obtained by variously modifying the embodiment as conceived by those skilled in the art or those achieved by combining the constituent elements in the embodiment without departing from the scope and spirit of the present disclosure.

For example, an example has been described above in the embodiment where mode shift manager 15 has both the following functions. The one is to shift the control mode in accordance with the magnitude relation between the current vehicle speed and the first and second thresholds, and the magnitude relation between the speed as the vehicle is instructed and the current vehicle speed. The other is to shift the control mode in accordance with the instruction information according to a shift operation. The functions are not limited thereto. For example, mode shift manager 15 may have no function of shifting the control mode in accordance with the instruction information.

For example, an example has been described above in the embodiment where vehicle control device 10 includes mode shift manager 15. Alternatively, vehicle control device 10 may include no mode shift manager 15. In this case, outputter 19 may output no vehicle speed control amount in accordance with the control mode. For example, outputter 19 may determine the magnitude relation between the current vehicle speed and the first and second thresholds. In accordance with a result of the determination, outputter 19 may determine whether to output the depression amount of the operation pedal as a moving speed control amount or the control amount converted from the speed as the vehicle is instructed as the moving speed control amount.

For example, an example has been described above in the embodiment where vehicle control device 10 includes acceleration graduality corrector 17. Alternatively, vehicle control device 10 may include no acceleration graduality corrector 17.

For example, an example has been described above in the embodiment where vehicle control device 10 includes limiter 18. Alternatively, vehicle control device 10 may include no limiter 18.

For example, an example has been described above in the embodiment where the first and second thresholds are determined based on the operation history or the vehicle speed history. Alternatively, the first and second thresholds may not be determined based on the history and may be manually set by a person.

For example, an example has been described above in the embodiment where the operator of operation UI 101 makes an instruction to shift the control mode of the vehicle speed. Alternatively, the operator of operation UI 101 may make no instruction to shift the control mode.

For example, the embodiment has been described above focusing on, as an operation pedal, the accelerator pedal of operation UI 101. The present disclosure is also applicable to the brake pedal of operation UI 101, For example, in the above description, the "operation pedal" may be replaced with the brake pedal of operation UI 101.

For example, the present disclosure is implemented as a program that causes a processor to execute the steps included in the information processing method. The present disclosure is also implemented as a non-transitory computer-readable recording medium, such as a CD-ROM, storing the program.

For example, if the present disclosure is implemented as a program (software), the program is executed using hardware resources such as a CPU, a memory, and input/output circuits of a computer to execute the steps. That is, the CPU obtains data from the memory or the input/output circuits to perform calculation, and outputs a result of the calculation to the memory or the input/output circuits to execute the steps.

In the embodiment described above, the constituent elements of information processing device 10 may be implemented by dedicated hardware or by executing software programs suitable for the constituent elements. The constituent elements may be implemented by a program executer such as a CPU or a processor reading and executing the software programs stored in a storage medium such as a hard disk or a semiconductor memory.

Some or all of the functions of information processing device 10 in the embodiments described above may be typically included in an LSI circuit that is an integrated circuit. These functions may be included as individual chips, or some or all of the functions may be integrated into a chip. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

The present disclosure includes other variations, such as those obtained by variously modifying the embodiment of the present disclosure as conceived by those skilled in the art without departing from the scope and spirit of the present disclosure.

INDUSTRIAL APPLICABILITY

The present disclosure is applicable to a moving body such as a vehicle operatable in a remote location.

The invention claimed is:
1. An information processing device comprising:
a first obtainer that obtains a first moving speed of a moving body;
a second obtainer that obtains an operation amount of an operation related to a moving speed by an instrument for a remote operation of the moving body;
a generator that generates a second moving speed based on the operation amount; and
an outputter that outputs
the operation amount as a moving speed control amount that is an amount of controlling the moving speed of the moving body, when the first moving speed is lower than a first threshold, and
a control amount converted from the second moving speed as the moving speed control amount, when the first moving speed is higher than or equal to a second threshold.
2. The information processing device according to claim 1, further comprising:
a shift controller that shifts
a moving speed control mode of the moving body to a first mode for outputting the operation amount as the moving speed control amount, when the first moving speed is lower than the first threshold and the second moving speed is lower than the first moving speed, and
the moving speed control mode of the moving body to a second mode for outputting the control amount converted from the second moving speed as the moving speed control amount, when the first moving speed is higher than or equal to the second threshold and the second moving speed is higher than the first moving speed, wherein the outputter outputs the moving speed control amount in accordance with the first mode or the second mode.
3. The information processing device according to claim 2, further comprising:
a setter that sets an upper limit of the moving speed control amount based on the first moving speed, when the moving speed control mode of the moving body is shifted and a difference between the first moving speed and the second moving speed is larger than a third threshold, wherein
the outputter outputs the moving speed control amount further in accordance with the upper limit of the moving speed control amount.
4. The information processing device according to claim 2, wherein
the second obtainer obtains instruction information further based on a shift operation as an instruction to shift the moving speed control mode of the moving body, and
the shift controller shifts the moving speed control mode of the moving body in accordance with the instruction information.
5. The information processing device according to claim 1, wherein
the generator generates the second moving speed in accordance with the operation amount to set an upper limit of the operation amount to be equal to an upper limit of the moving speed of the moving body.
6. The information processing device according to claim 1, wherein
the second obtainer further obtains the first threshold and the second threshold determined based on at least one of an operation amount history related to the moving speed or a moving speed history.
7. The information processing device according to claim 6, wherein
the second obtainer obtains the first threshold and the second threshold determined further based on an operation amount history related to a moving direction of the moving body.
8. The information processing device according to claim 6, wherein
the second obtainer obtains the first threshold and the second threshold determined further based on a history of a shift operation as an instruction to shift the moving speed control mode of the moving body.
9. The information processing device according to claim 6, wherein
the second obtainer obtains the first threshold and the second threshold determined further based on an operation history associated with an operator of the instrument.
10. An information processing method to be executed by a computer, the information processing method comprising:
obtaining an operation amount of an operation related to a moving speed by an instrument for a remote operation of the moving body;
outputting the operation amount obtained;
obtaining mode information indicating whether a moving speed control mode of the moving body is a first mode or a second mode, the first mode being for outputting the operation amount as a moving speed control amount that is an amount of controlling the moving speed of the moving body when a first moving speed of the moving body is lower than a first threshold, the second mode being for outputting a control amount converted from a second moving speed generated based on the operation amount as the moving speed control amount when the first moving speed is higher than or equal to a second threshold; and indicating the moving speed control mode of the moving body based on the mode information.

11. The information processing method according to claim 10, further comprising:

obtaining an operation history including at least a history of the operation amount related to the moving speed or a moving speed history;

determining the first threshold and the second threshold based on at least one of the operation history or the moving speed history; and outputting the first threshold and the second threshold determined.

12. The information processing method according to claim 11, wherein the operation history further includes an operation amount history related to a moving direction of the moving body.

13. The information processing method according to claim 11, wherein the operation history further includes a history of a shift operation as an instruction to shift the moving speed control mode of the moving body.

14. The information processing method according to claim 11, further comprising:

identifying an operator of the instrument;

obtaining a specific operation history associated with the operator identified;

determining the first threshold and the second threshold based on the specific operation history; and outputting the first threshold and the second threshold determined.

15. The information processing method according to claim 11, further comprising:

obtaining a shift operation as an instruction to shift the moving speed control mode of the moving body;

generating instruction information based on the shift operation; and outputting the instruction information.

* * * * *